United States Patent
Kirscht

(10) Patent No.: US 9,197,584 B2
(45) Date of Patent: Nov. 24, 2015

(54) INCREASING EFFICIENCY OF DATA PAYLOADS TO DATA ARRAYS ACCESSED THROUGH REGISTERS IN A DISTRIBUTED VIRTUAL BRIDGE

(71) Applicant: International Business Machines Corporation, Armonk, NY (US)

(72) Inventor: Joseph A. Kirscht, Rochester, MN (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 229 days.

(21) Appl. No.: 13/959,432

(22) Filed: Aug. 5, 2013

(65) Prior Publication Data
US 2015/0036691 A1 Feb. 5, 2015

(51) Int. Cl.
*H04L 12/933* (2013.01)
*H04L 12/947* (2013.01)
*H04L 12/741* (2013.01)
*H04L 12/713* (2013.01)
*H04L 12/721* (2013.01)

(52) U.S. Cl.
CPC .............. *H04L 49/15* (2013.01); *H04L 45/586* (2013.01); *H04L 45/70* (2013.01); *H04L 45/74* (2013.01); *H04L 49/25* (2013.01)

(58) Field of Classification Search
CPC ....................................................... H04L 49/15
See application file for complete search history.

(56) References Cited

U.S. PATENT DOCUMENTS

| | | | | |
|---|---|---|---|---|
| 5,163,131 A | * | 11/1992 | Row et al. | 709/202 |
| 5,764,638 A | * | 6/1998 | Ketchum | 370/401 |
| 6,651,107 B1 | * | 11/2003 | Conley et al. | 709/250 |
| 7,406,572 B1 | * | 7/2008 | Nguyen | 711/154 |
| 8,447,909 B2 | | 5/2013 | Corrigan et al. | |
| 2009/0132751 A1 | * | 5/2009 | Simmons | 711/5 |

* cited by examiner

*Primary Examiner* — Brian D Nguyen
*Assistant Examiner* — Toan Nguyen

(57) ABSTRACT

A system and method for efficient transfer of data in a data from a controlling bridge to a register of a distributed bridge element. A Load Store over Ethernet (LSoE) frame processing engine (FPE) is equipped with a repeat and a repeat with strobe function that, when coupled with an auto-increment function of an indirect register facility, allows a distributed virtual bridge to move data payload more efficiently which decreases the data loading on the computers data paths used for other data transfers.

12 Claims, 8 Drawing Sheets

| LSoE Frame Action – Auto Increment | LSoE Frame (1522 Bytes) | | Result |
|---|---|---|---|
| | | | |
| 610 Write Control Reg. to Acc. Ctr 0 | 8 Byte Control | 8 Byte Data | Initiate Read, Enable Auto Inc. |
| Read Data Reg. to Obtain Ctr 0 | 8 Byte Control | 8 Byte Data | Trigger Auto Increment - Read |
| Read Data Reg. to Obtain Ctr 1 | 8 Byte Control | 8 Byte Data | Trigger Auto Increment - Read |
| Read Data Reg. to Obtain Ctr 2 | 8 Byte Control | 8 Byte Data | Trigger Auto Increment - Read |
| . . . | | | |
| Read Data Reg. to Obtain Ctr 89 | 8 Byte Control | 8 Byte Data | Trigger Auto Increment - Read |
| 612 Wrt Control Reg. to Disable AI. | 8 Byte Control | 8 Byte Data | Disable Auto Increment |
| 614 Read Data Reg. to Obtain Ctr 90 | 8 Byte Control | 8 Byte Data | Read Last Cntr (90) |

FIG. 6
Prior Art

| LSoE Frame Action – Repeat | LSoE Frame (1522 Bytes) | | Result |
|---|---|---|---|
| | | | |
| 710 Write Control Reg. to Acc. Ctr 0 | 8 Byte Control | 8 Byte Data | Initiate Read, Enable Auto Inc. |
| 712 Repeat Rd Data Reg. Ctr 0 - 178 | 8 Byte Control | 178 x 8 Data | Trigger Auto Increment - Read |
| 714 Write Control Reg. to Disable AI | 8 Byte Control | 8 Byte Data | Disable Auto Increment |
| 716 Read Data Reg. (Ctr 179) | 8 Byte Control | 8 Byte Data | Read Last Cntr (179) |

FIG. 7

| LSoE Frame Action – Repeat w Strobe | LSoE Frame (1522 Bytes) | | Result |
|---|---|---|---|
| 810 | Write Control Reg. to Ctrs G0,Y0,R0 | 8 Byte Control | 8 Byte Data | Initiate Read, Enable Auto Inc. |
| 812 | Rpt Rd x 177 w Strobe x3 G0,Y0,R0,G1,Y1,R1.... | 8 Byte Control | 177 x 8 Data | Trigger Auto Increment - Read |
| 814 | Write Control Reg. to Disable AI | 8 Byte Control | 8 Byte Data | Disable Auto Increment |
| 816 | Seq. Rd Data Reg. x 3 to Obtain Control G59, Y59, R59 | 8 Byte Control | 3x8 Byte Data | Read Last 3 Cntr (G59,Y59,R59) |

FIG. 8

INCREASING EFFICIENCY OF DATA PAYLOADS TO DATA ARRAYS ACCESSED THROUGH REGISTERS IN A DISTRIBUTED VIRTUAL BRIDGE

BACKGROUND

1. Technical Field

This disclosure generally relates to data transfer, and more specifically relates to improving efficiency of data payloads to data arrays accessed through registers in a distributed virtual bridge.

2. Background Art

Server computers are continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches. Increasing the number of switches and associated connections to accommodate additional traffic may present configuration and management challenges, as well as increase hardware costs and latency. It is therefore desirable to increase the efficiency with which switches may forward data frames between server computers.

The prior art section below (referenced from U.S. Pat. No. 8,447,909) describes a method by which a controlling bridge can access registers within any bridge element of a distributed switch. Such requests traverse the interconnects of the distributed switch using many of the same resources that are used for normal Ethernet traffic. Typical accesses may include changing configuration settings, accessing various tables, such as insertion of entries into forwarding databases, and the like. This data access uses an indirect register interface in which there is a control register and one or more data registers to access large tables of data. Accessing the tables using the indirect indexing method requires large frames of control data. These large frames of register access compete directly with the available resources that are being used for normal Ethernet traffic (such as buffering resources, interconnect link bandwidth, etc). It is, therefore, desirable to make such accesses as efficient as possible.

BRIEF SUMMARY

Described herein is a system and method for efficient transfer of data in an Ethernet frame from a controlling bridge to a register of a distributed bridge element. A Load Store over Ethernet (LSoE) frame processing engine (FPE) is equipped with a repeat function and a repeat with strobe function that, when coupled with an auto-increment function of an indirect register facility, allows a distributed virtual bridge to move data payloads more efficiently which decreases the data loading on the computers data paths used for other data transfers.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 6 is a block diagram of a LSoE frame, along with the actions taken and results for sending data according to the prior art;

FIG. 7 is a block diagram of a LSoE frame, along with the actions taken and results for sending data using a repeat function as described and claimed herein;

FIG. 8 is a block diagram of a LSoE frame, along with the actions taken and results for sending data using a repeat function with strobe as described and claimed herein;

DETAILED DESCRIPTION

The claims and disclosure herein provide mechanisms and methods for efficient transfer of data in an Ethernet frame from a controlling bridge to a register of a distributed bridge element. A Load Store over Ethernet (LSoE) frame processing engine (FPE) is equipped with a repeat function and a repeat with strobe function that, when coupled with an auto-increment function of an indirect register facility, allows a distributed virtual bridge to move data payloads more efficiently which decreases the data loading on the computers data paths used for other data transfers.

Figure 1:
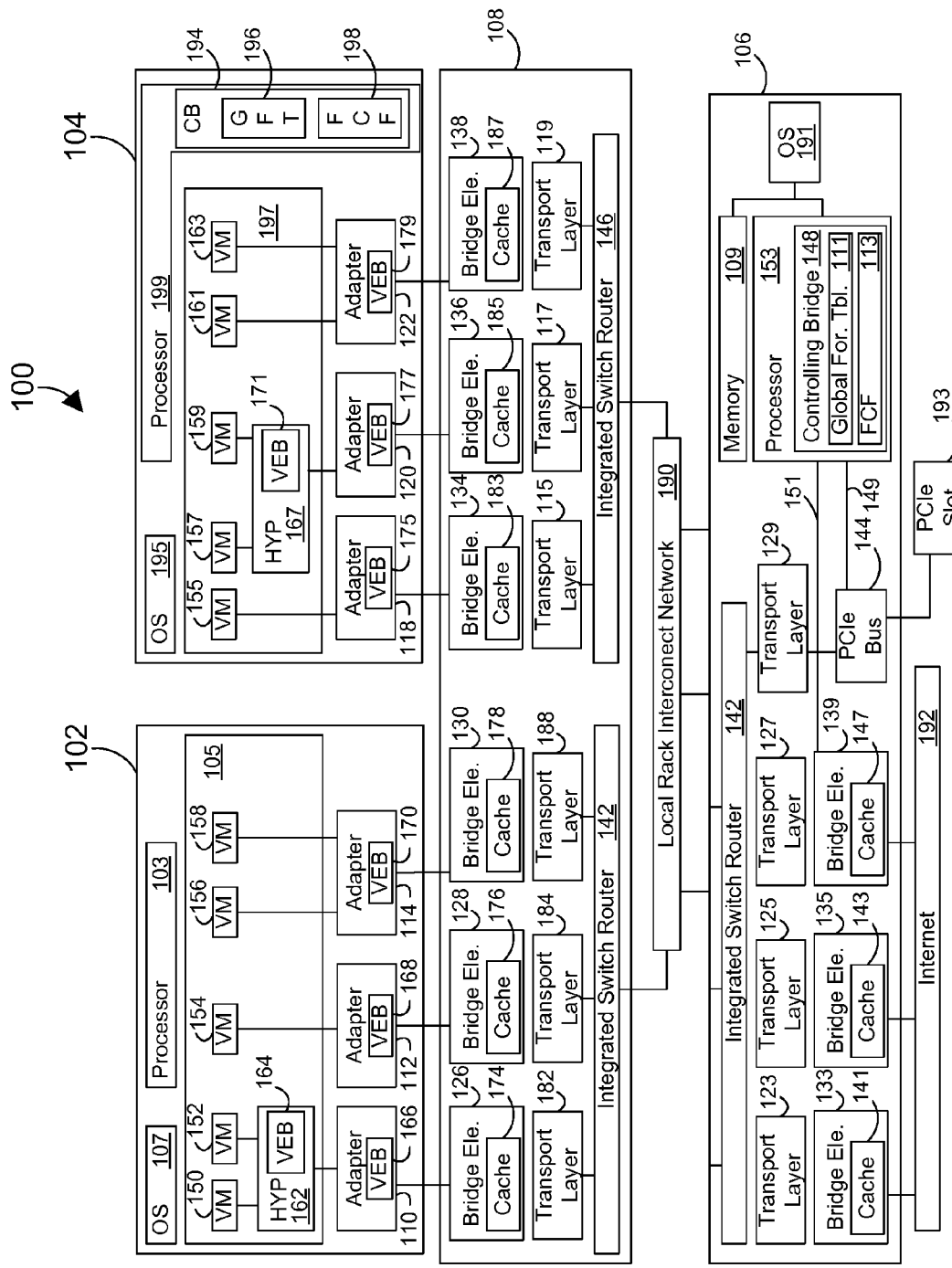
FIG. 1 is a block diagram of a prior art system configured to remotely access registers using distributed bridge elements and one or more controlling bridges.

FIG. 1 illustrates a highly integrated system 100 configured to conduct register access operations using a plurality of distributed bridge elements and one or more controlling bridges according to the prior art. FIG. 1 generally shows a computer system 100 configured to forward data frames using a distributed virtual bridge 108. The distributed virtual bridge 108 may selectively forward data frames having access register requests to distributed bridge elements and other target nodes. The system 100 includes a first server computer 102 and a second server computer 104 that are both coupled to an I/O blade device 106 via the distributed virtual bridge 108. The server computers 102, 104 and the I/O blade device 106 may be housed within separate chassis and racks. The distributed virtual bridge 108 may be coupled to multiple adapters 110, 112, 114, 118, 120 and 122. The adapters 110, 112, 114, 118, 120 and 122 may be located within or may be coupled to the server computers 102, 104. The distributed virtual bridge 108 may use multiple access points, or bridge elements 126, 128, 130, 134, 136 and 138 to couple to the server computers 102, 104. For example, a microchip that includes the bridge elements 126, 128, and 130 may be cabled or otherwise coupled to a port of the server computer 102 that includes the adapter 110. As explained herein, the distributed virtual bridge 108 may functionally supplant chassis switches and top of rack switches with a frame-based network fabric that functions in a similar fashion to an Ethernet network.

One or more transport layer modules 182, 184 and 188 coupled to the bridge elements 126, 128, and 130 may provide a frame-based, Ethernet-like interface to one or more integrated switch routers 142. The transport layer module 182 may be configured to deconstruct a transmission of data frames so that packet information may be evenly distributed across links to a local rack interconnect network 190. The data frames may not be serialized upon leaving the transport layer module 182. A receiving transport layer module 123 may serialize the data frames to achieve reliable, in-order delivery. If the receiving transport layer module 123 determines that data frame information is missing, the transport layer module 123 may initiate a process to recover the missing data. The translation process may be accomplished in hardware, which may provide a larger bandwidth and faster processing than software applications. The transport layer modules 182, 184, and 188, the integrated switch router 142, and the local rack interconnect network 190 may combine to include an underlying lossless, point-to-point communication network (i.e., an integrated switch router network) between the server computers 102, 104 and the I/O blade device 106.

The bridge elements 126, 128 and 130 may function as data link layer (i.e., Layer 2) bridge forwarders within the distributed virtual bridge 108. In particular embodiments, the bridge elements 126, 128, and 130 may comprise a switch, or router device. The bridge elements 126, 128 and 130 may include learned (e.g., received and stored) cached address data used to forward data frames throughout the distributed virtual bridge 108. The learned address data may correspond to one or both of a destination address and a source address associated with a data frame. When the bridge element 126 does not include address data pertinent to a source or destination address of a received data frame, the bridge element 126 may query a controlling bridge 148 for the address data. The controlling bridge 148 may include a global forwarding table 111 that includes stored address data. The stored address data may be continuously updated by the bridge elements 126, 128 and 130. For example, a bridge element 126 may send an update message to the controlling bridge 148 in response to learning an updated or new MAC address. A corresponding MAC address in the global forwarding table 111 may be subsequently updated. Conversely, the address data of the global forwarding table 111 may be used to update the bridge elements 126, 128 and 130. For example, the controlling bridge 148 may respond to a query from the bridge element 126 with requested address data. The bridge element 126 may cache the received address data for future use.

The first server computer 102 may include one or more virtual machines (VMs) 150, 152, 154, 156, and 158. A virtual machine may include a software implementation of a computer and may execute programs in a manner similar to a physical machine. FIG. 1 shows an illustrative hypervisor 162 that is coupled to both the virtual machine 150 and the virtual machine 152. The hypervisor 162 may include platform virtualization software that allows multiple operating systems to run concurrently on the first server computer 102. The hypervisor 162 may include a hypervisor virtual bridge 164 that allows direct communication between the virtual machines 150, 152 without traversal of an external network. In one embodiment, the hypervisor virtual bridge 164 may register address information with the controlling bridge 148.

The server computer 102 may include at least one processor 103 coupled to a memory 105. The processor 103 may represent one or more processors (e.g., microprocessors), and the memory 105 may represent random access memory (RAM) devices comprising the main storage of the server computer 102, as well as supplemental levels of memory, e.g., cache memories, non-volatile or backup memories (e.g., programmable or flash memories), read-only memories, etc. In addition, the memory 105 may be considered to include memory storage physically located in the server computer 102 or on another server computer 104 coupled to the server computer 102 via the distributed virtual bridge 108. The first server computer 102 may operate under the control of an operating system (OS) 107 and may execute or otherwise rely upon various computer software applications, components, programs, objects, modules, and data structures, such as the virtual machines 150, 152, 154, 156, and 158. Moreover, various applications, components, programs, objects, modules, etc. may also execute on one or more processors in another device coupled to the server computer 102 (e.g., in a distributed computing environment, where computing processes may be allocated to multiple server computers). The first server computer 102 may include the adapters 110, 112 and 114, such as converged network adapters. A converged network adapter may include a single root I/O virtualization (SR-IOV) adapter, such as a Peripheral Component Interconnect Express (PCIe) adapter that supports Converged Enhanced Ethernet (CEE). The adapters 110, 112 and 114 may be used to implement a Fiber Channel over Ethernet (FCoE) protocol. Each adapter 110, 112 and 114 may be coupled to one or more of the virtual machines 150, 152, 154, 156 and 158. The adapters 110, 112 and 114 may facilitate shared access of the virtual machines 150, 152, 154, 156 and 158. While the adapters 110, 112, and 114 are shown in FIG. 1 as being included within the server computer 102, adapters of another embodiment may include physically distinct devices that are separate from the server computers 102, 104.

Each adapter 110, 112, and 114 may include a converged adapter virtual bridge 166, 168 and 170. The converged adapter virtual bridges 166, 168 and 170 may facilitate sharing of the adapters 110, 112, and 114 by coordinating access by the virtual machines 150, 152, 154, 156 and 158. Each converged adapter virtual bridge 166, 168, and 170 may recognize data flows included within its domain. A recognized domain address may be routed directly, without processing or storage outside of the domain of the particular converged adapter virtual bridge 166, 168 and 170. Each adapter 110, 112 and 114 may include one or more CEE transmit ports that couple to one of the bridge elements 126, 128, and 130. In another embodiment, bridge elements may be co-located with the adapters, and coupling between adapters and the bridge elements may not be Ethernet connections. The bridge elements 126, 128 and 130 may be configured to forward data frames throughout the distributed virtual bridge 108. The bridge elements 126, 128 and 130 may thus function as access points for the distributed virtual bridge 108 by translating between Ethernet and the integrated switch router 142. The bridge elements 126, 128 and 130 may not include buffers and may support CEE at boundaries of the distributed virtual bridge 108. In another embodiment, the bridge elements 126, 128 and 130 may include buffers. Each bridge element 126, 128 and 130 of the distributed virtual bridge 108 may include a forwarding cache 174, 176 and 178. A forwarding cache 174, 176 and 178 may include a lookup table that stores address data used to forward data frames that are received by the bridge elements 126, 128 and 130. For example, the bridge element 126 may compare address data associated with a received data frame to the address data stored within the forwarding cache 174.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 113, as set by an administrator or computing system. The Fiber Channel Forwarder 113, or FCoE switch, may facilitate connectivity between FCoE initiators and Fiber Channel fabrics. To illustrate, an FCoE data frame sent from the first virtual machine 158 and intended for a second virtual machine 163 may be addressed to the Fiber Channel Forwarder 113 in accordance with the FCoE standard. According to standard routing procedures, the Fiber Channel Forwarder 113 may receive and readdress the FCoE data frame for forwarding to the virtual machine 163. The Media Access Control (MAC) address of the Fiber Channel Forwarder 113 may have been learned by the first server computer 102 during a discovery phase, when the Fiber Channel Forwarder 113 establishes communications with networked devices. During the discovery phase, the second server computer 104 may respond to broadcast queries from the first server computer 102. The Fiber Channel Forwarder 113 may discover the second server computer 104 from the query responses. After the discovery phase, a login phase may be initiated. A MAC address of the server computer 104 may be reassigned by the Fiber Channel Forwarder 113. The reassigned MAC address may be used for subsequent routing and communications between the server computers 102, 104. The Fiber Channel Forwarder 113 may facilitate storage of MAC addresses assigned to the server computers 102, 104.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth. A logical network may include a logically specified network portion of the distributed virtual bridge 108. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 174, 176, and 178 of the distributed virtual bridge 108 may have a format similar to the global forwarding table 111 of the controlling bridge 148. The forwarding caches 174, 176 and 178 may have smaller memory capacities than the global forwarding table 111. The forwarding caches 174, 176 and 178 may further be updated with address data learned from data frames that flow through the bridge elements 126, 128 and 130. The address data may additionally be updated with address data received from the global forwarding table 111. Invalid or changed address data that is updated within one or more of the forwarding caches 174, 176 and 178 of the bridge elements 126, 128 and 130 may be communicated to the global forwarding table 111 of the controlling bridge 148. For example, the bridge element 126 may learn a new MAC address of a newly added device that is configured to receive from or send data to the distributed virtual bridge 108. The bridge element 126 may verify that a source MAC address included within a received data frame is allowed at a port by checking a list stored within a memory. The bridge element 126 may send a registration message to the controlling bridge 148 to update the global forwarding table 111 with the verified MAC address. The bridge element 126 may further store the MAC address within the forwarding cache 174. In another example, the bridge element 126 may identify a MAC address that is infrequently used. This infrequently used MAC address may be removed from the forwarding cache 174 to make storage room available for other MAC addresses. The bridge element 126 may send an update message to the controlling bridge 148 to have the MAC address removed from the global forwarding table 111.

Address data stored within the global forwarding table 111 may be communicated to one or more forwarding caches 174, 176 and 178 of the distributed virtual bridge 108. For example, the bridge element 126 may receive a data frame that includes a destination MAC address that is not stored within the forwarding cache 174. To obtain information for forwarding the data frame, the bridge element 126 may send a query to a bridge element 139 configured to access the controlling bridge 148. The bridge element 139 may search the global forwarding table 111 for address data associated with the destination MAC address. If the address data is found, the bridge element 139 may forward the MAC address through the distributed virtual bridge 108 to the querying bridge element 126. The bridge element 126 may store the MAC address as address data within the forwarding cache 174. As with the global forwarding table 111, the address data included within the forwarding caches 174, 176 and 178 of the distributed virtual bridge 108 may include both internal address information, as well as addresses that are external to the system 100. Each of the bridge elements 126, 128 and 130 may be connected to one or more of the transport layer modules 182, 184 and 188. The transport layer modules 182, 184 and 188 may include buffering used for attachment to the integrated switch router 142. The transport layer modules 182, 184 and 188 may further provide a frame-based, Ethernet-like interface to the integrated switch router 142.

The transport layer modules 182, 184 and 188 may each include a shared buffer used to transmit frames across the integrated switch router 142. Additional buffers of the transport layer modules 182, 184, and 188 may be used to receive data frames from the integrated switch router 142. The buffers may be divided into different virtual lanes. Virtual lanes may include logically separated paths for data frame traffic flowing between a bridge element and a transport layer module. For example, there may be four virtual lanes between the bridge element 126 and the transport layer module 182. The transport layer modules 182, 184 and 188 may include logic to recover from faulty microchips and links between a source and a destination. The transport layer modules 182, 184 and 188 may maintain a strict ordering of packets within a particular virtual lane regardless of each data frame's path through the local rack interconnect network 190 and the computer system 100.

The integrated switch router 142 may communicate with the transport layer modules 182, 184 and 188 and may facilitate routing and packet delivery to and from the local rack interconnect network 190. The local rack interconnect network 190 may include links to the bridge elements 126, 128 and 130 located within the same chassis and rack, as well as links to the bridge elements 134, 136 and 138 in different chassis and racks. The local rack interconnect network 190 may include point-to-point connections, or pipes, between the bridge elements 126, 128, 130 and 134, 136, 138 of the distributed virtual bridge 108 with no frame loss and with in-order frame delivery. The second server computer 104 may be similar to the first server computer 102. The second server computer 104 may be located within a different chassis and rack than the first server computer 102. Similar to the first server computer 102, the second server computer 104 may include a processor 199 coupled to a memory 197 and to an operating system 195. The processor 199 may include a controlling bridge (CB) 194, a global forwarding table (GFT) 196, and a fiber channel forwarder (FCF) 198. The second server computer 104 may further include virtual machines 155, 157, 159, 161 and 163.

A hypervisor 167 may be coupled to the virtual machines 157, 159. The hypervisor 167 may include a hypervisor virtual bridge 171 that allows direct communication between the virtual machines 157, 159. For example, the hypervisor virtual bridge 171 may register address data with the controlling bridge 148. The second server computer 104 may also include one or more adapters 118, 120 and 122, such as converged CEE network adapters. Each adapter 118, 120 and 122 may be coupled to one or more of the virtual machines 155, 157, 159, 161 and 163. The adapters 118, 120 and 122 may each include a converged adapter virtual bridge 175, 177 and 179. The converged adapter virtual bridges 175, 177 and 179 may facilitate sharing of the adapters 118, 120 and 122 by coordinating virtual machine access. The adapters 118, 120 and 122 may each couple to one or more of the bridge elements 134, 136 and 138 of the distributed virtual bridge 108. Each adapter 118, 120 and 122 may include one or more CEE transmit ports that couple to one of the bridge elements 134, 136, or 138. Each bridge element 134, 136 and 138 may include a forwarding cache 183, 185 and 187 that includes address data used to forward data frames that are received by the bridge elements 134, 136 and 138. The bridge elements 134, 136 and 138 may each be connected to one or more transport layer modules 115, 117 and 119. The transport layer modules 115, 117 and 119 may include buffering used for the attachment to the integrated switch router 146. The transport layer modules 115, 117 and 119 may further provide a frame-based, Ethernet-like interface to the integrated switch router 146 and may maintain packet ordering. A portion of the distributed virtual bridge 108 shown in FIG. 1 as located above the local rack interconnect network 190 and as associated with the server computers 102, 104 may be referred to as a north portion. The bridge elements 126, 128, 130, 134, 136 and 138 may be coupled to the adapters 110, 112, 114, 118, 120 and 122.

The I/O blade device 106 may be an I/O server computer. As such, the I/O blade device 106 may allow uplink connectivity to an external Ethernet network 192 via an integrated switch router 142 that is coupled to transport layer modules 123, 125, 127 and 129. The transport layer modules 123, 125, 127 and 129 may each couple to a bridge element 133, 135 and 139. The bridge elements 133, 135, 137, and 139 may each include a forwarding cache 141, 143 and 147. The I/O blade device 106 may be categorized as being included within a south portion of the distributed virtual bridge 108 because the bridge elements 133, 135, and 139 may be coupled to an uplink to the Internet 192. The I/O blade device 106 may include a memory 109, an operating system 191, and a processor 153 that includes the controlling bridge 148. The bridge element 139 may be coupled to the processor 153 via an Ethernet link connection 151. The transport layer module 129 may be coupled to a PCIe bus 144 that is coupled via a PCIe link connection 149 to the processor 153 and the controlling bridge 148. The PCIe bus 144 may also be coupled to a PCIe slot 193.

The controlling bridge 148 may communicate with the bridge elements 126, 128, 130, 134, 136 and 138 and other controlling bridges (not shown) of the computer system 100. The controlling bridge 148 may include firmware executing on the processor 153 that manages the bridge elements 126, 128, 130, 134, 136 and 138. For example, the controlling bridge 148 may be configured to divide a workload between the bridge elements 126, 128, 130, 134, 136 and 138, as well as perform synchronization procedures and failover operations. The controlling bridges 148, 194 may be configured to interface with and program the bridge elements 126, 128, 130, 134, 136 and 138. More particularly, the controlling bridges 148 and 194 may be configured to generate and send a data frame to one or more of the bridge elements 126, 128, 130, 134, 136 and 138. The data frames may include register access requests used by the bridge elements 126, 128, 130, 134, 136 and 138 to access registers.

The controlling bridge 148 may include the Fiber Channel Forwarder 113, FCoE may offer the capability to transport fiber channel payloads on top of an Ethernet network. The Fiber Channel Forwarder 113 may execute the Fiber Channel Initialization Protocol to discover and initialize FCoE capable entities connected to an Ethernet cloud. The Fiber Channel Forwarder 113 may further include firmware that encapsulates and de-encapsulates Fiber Channel data frames (e.g., FCoE formatted data frames). In at least one embodiment, the Fiber Channel Forwarder 113 may translate between Ethernet and Fiber Channel protocols. The controlling bridge 148 may additionally include the global forwarding table 111. The global forwarding table 111 may include address data (e.g., MAC addresses) that is registered and maintained through communication and cooperation with the bridge elements 126, 128, 130, 134, 136 and 138, and in some cases, the hypervisors 162 and 167.

In one example, the global forwarding table 111 may maintain MAC addresses that have been learned by a bridge element 126. The bridge element 126 may register the address data with the controlling bridge 148. The controlling bridge 148 may update the global forwarding table 111 by adding the address data to the global forwarding table 111. Similarly, the bridge element 126 may cause the controlling bridge 148 to update the global forwarding table 111 by sending an update message to the controlling bridge 148. The update message may cause the controlling bridge 148 to delete a MAC address that has been aged out by the bridge element 126. A MAC address may further be deleted when the bridge element 126 has detected that the address data is no longer valid.

In another example, the hypervisor virtual bridge 164 may register MAC addresses or other address data with the controlling bridge 148. The global forwarding table 111 may include address data associated with addresses that are included within the system 100, as well as addresses that are external to the system 100. The controlling bridge 194 with its corresponding global forwarding table 196 and fiber channel forwarder 198 performs similar functions as controller bridge 418 discussed above.

FIG. 1 thus shows an embodiment of a system 100 that includes a distributed virtual bridge 108 configured for lossless, point-to-point, in-order data frame delivery. The system 100 may support Fiber channel over Ethernet (FCoE) and may be scalable to include hundreds or more server computers. The controlling bridges 148, 194 may be configured to interface with and program registers of the bridge elements 126, 128, 130, 134, 136, 138 and the adapters 166, 168, 170, 175, 177, 179 to reduce administrator workloads. The automated register accesses may reduce potential bottlenecks and facilitate efficient processing.

Figure 2:
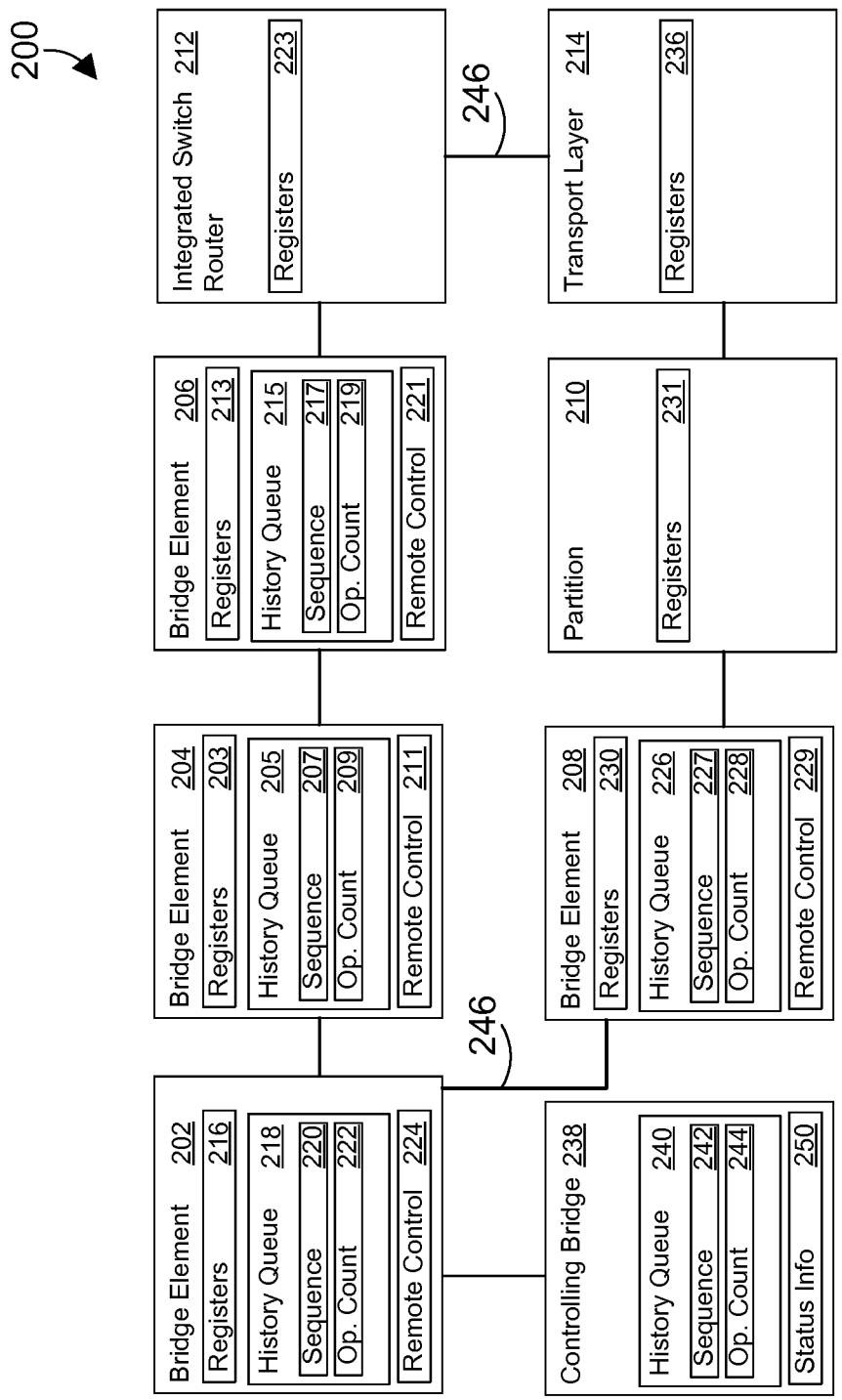
FIG. 2 is a block diagram of another prior art system configured to conduct register access operations using a plurality of distributed bridge elements and one or more controlling bridges.

FIG. 2 illustrates another particular embodiment of a prior art system 200 configured to conduct register access operations using a plurality of distributed bridge elements 202, 204, 206, 208 and one or more controlling bridges 238. The controlling bridge(s) 238 may be connected by an Ethernet network interface controller (NIC) directly or indirectly through a Local Rack Interconnect, such as the Local Rack Interconnect Network 190 of FIG. 1. A main register ring 246 may include a communications path that uses a register ring protocol to connect nodes on a microchip. For example, the main register ring 246 may be coupled to the bridge elements 202, 204, 206, 208, a partition 210, an integrated switch router 212, and a transport layer module 214. The bridge elements 202, 204, 206, 208 may include low latency, high speed switches that are similar to the bridge elements 126, 128, 130, 134, 136, 138 of FIG. 1. The partition 210 may include a defined storage area that includes registers 231. The integrated switch router 212 may include registers 223 and may be similar to the integrated switch routers 142, 146 of FIG. 1. The transport layer module 214 may include registers 236 and may be similar to the transport layer modules 115, 117, 119, 123, 125, 127, 129, 182, 184, 188 of FIG. 1.

On the main register ring 246, some of the nodes may be both initiators and targets with regard to register access requests. For example, the bridge elements 202, 204, 206, 208 may be configured to both initiate and receive a register access request. Other nodes, such as the partition 210, the integrated switch router 212, and the transport layer module 214, may only receive register access requests. When making a register access request to another bridge element 202, 206, 208, the bridge element 204 may wait for a token on the main register ring 246. Once the token is received, the bridge element 204 may place the register access request on the main register ring 246. The receiving, or target, bridge element 206 to which the register access request is addressed may execute the register access request and communicate a response to the bridge element 204. The bridge element 204 may then return the token to the main register ring 246. To prevent conflicting register access operations from multiple controlling bridges, the controlling bridge 238 may select a bridge element 206 to be a bridge element control port. The bridge element control port may be used when accessing the registers 223, 231, 236 other than bridge element registers 203, 213, 216, 230.

Each bridge element 202, 204, 206, 208 may directly access its own local registers 216, 203, 213, and 230, respectively to facilitate parallel access by the controlling bridge 238. The access may occur without a token received from the main register ring 246. A bridge element may delay operations from the main register ring 246 until the register access requests have been completed. Each bridge element may comprise a local bridge element coupled to the controlling bridge 238. Each bridge element may be similar to the bridge element 139 of FIG. 1. The bridge element 202 may include the registers 216, a history queue 218, and a remote control module 224. The history queue 218 may include FIFO entries that include sequence numbers 220. The sequence numbers 220 may correspond to data frames having register access requests. An operations count 222 may correspond to a number of successfully completed register access requests associated with a data frame. While only one history queue 218 is shown as being included in the bridge element 202, an embodiment of another bridge element may include multiple history queues (e.g., a history queue for each controlling bridge that may control the bridge element). The remote control module 224 may be configured to execute the register access requests, as well as to update the sequence numbers 220 and the operations count 222. The remote control module 224 may be configured to update operand fields of the data frame with request status information and to route data frames throughout the system 200.

The controlling bridge 238 may be directly coupled to the bridge element 202 via an Ethernet NIC or may be remotely coupled via a Local Rack Interconnect to communicate with the bridge elements 202, 204, 206, 208 using data frames that include register access requests. The controlling bridge 238 may use a semaphore mechanism to prevent other controlling bridges (not shown) from accessing a register 203, 213, 216, 223, 230, 231, 236 at the same time. The controlling bridge 238 may include a FIFO history queue 240 comprising sequence numbers 242 and operation counts 244. The sequence numbers 242 may be associated with respective data frames and their associated register access requests. The sequence numbers 242 may be unique. The operation counts 244 may be compared to operation counts 209, 219, 222, 228 stored in the bridge elements 202, 204, 206, 208 to determine a status of a register access request.

The controlling bridge 238 may additionally include status information 250 that is associated with register access requests. For example, the controlling bridge 238 may access the status information 250 to set an entry associated with a first register access request to "pending," The status information 250 may be set prior to sending a data frame along with the register access request. When an error is detected, the status information 250 may be updated to reflect details of the detected error. Entries associated with other register access request may be pending until the first register access request has been successfully completed. Illustrative status information may include: pending, completed, not completed with lock conflict, and error (e.g., access timeout, frame too short, and frame too long). The controlling bridge 238 may insert a four byte sequence number within a field of a data frame. The sequence number field may be unchanged by a receiving bridge element 204 that uses the sequence number field to update the sequence numbers 207. The bridge element 204 may return the data frame and associated sequence number to the controlling bridge 238. The controlling bridge 238 may check the sequence number of the returned data frame against the stored sequence numbers 242 to confirm delivery or to detect a loss of a data frame.

The controlling bridge 238 may access the history queue 215 when a data frame having an expected sequence number is not received at the controlling bridge 238 from the bridge element 206. The controlling bridge 238 may determine by reading the history queue 215 if the data frame having the sequence number was received by the bridge element 206. If the data frame was never received, the controlling bridge 238 may resend the data frame to the bridge element 206. If an entry in the history queue 215 indicates that the data frame was received at the bridge element 206, then the controlling bridge 238 may read the operations count 219 or the number of successfully completed operations. The operations count 219 may be used to determine whether an error was encountered while processing a register access request of the data frame at the bridge element 206.

A successfully completed operation may include a completed semaphore access. Each register access (i.e., a load or a store operation) of a set of sequential register accesses may be counted as a successfully completed operation. A register access that completes in error may not be counted as a successfully completed operation. A register access that includes a read on the main register ring 246 followed by a write to the main register ring 246 may be counted as a single successfully completed operation.

To prevent conflicting register access operations from multiple controlling bridges, the controlling bridge 238 may select a bridge element of the bridge elements 202, 204, 206, 208 to be a bridge element control port. The designated bridge element control port may be used when accessing registers other than bridge element registers. For instance, when a data frame is addressed to a non-bridge, element (e.g., the partition 210, the integrated switch router 212, or the transport layer module 214), a bridge element 208 designated by the controlling bridge 238 as the bridge element control port may receive and route the data frame to the non-bridge element target node. The controlling bridge 248 may send data frames directly to the bridge elements 202, 204, 206, 208 (i.e., without use of a designated bridge element control port). For example, when the bridge element 206 is the target of the data frame (and included register access request), the remote control module 221 of the bridge element 206 may receive the data frame.

The bridge elements 204, 206, 208 may comprise north bridge elements, such as the north bridge element 126 of FIG. 1. The bridge element 204 may include registers 203, a history queue 205, and a remote control module 211. The history queue 205 may include FIFO entries that include sequence numbers 207. The sequence numbers 207 may correspond to data frames having register access requests. An operations count 209 may correspond to a number of successfully completed register access requests associated with a data frame. The remote control module 211 may be configured to execute the register access requests, as well as to update the sequence numbers 207, the operations count 209, and the operand fields of the data frame. The bridge element 206 may include the registers 213, the history queue 215, and a remote control module 221. The history queue 215 may include FIFO entries that include sequence numbers 217. The sequence numbers 217 may correspond to data frames having register access requests. An operations count 219 may correspond to a number of successfully completed register access requests associated with a data frame. The remote control module 221 may be configured to execute the register access requests, as well as to update the sequence numbers 217, the operations count 219, and the operand fields of the data frame.

The bridge element 208 may include the registers 230, a history queue 226, and a remote control module 229. The history queue 226 may include FIFO entries that include sequence numbers 227. The sequence numbers 227 may correspond to data frames having register access requests. An operations count 228 may correspond to a number of successfully completed register access requests associated with a data frame. The remote control module 229 may be configured to execute the register access requests, as well as to update the sequence numbers 227, the operations count 228, and the operand fields of the data frame.

FIG. 2 thus shows an embodiment of a system 200 configured to enable a controlling bridge 238 to initiate register access requests using distributed bridge elements 202, 204, 206, and 208. The controlling bridge 238 may provide trusted (e.g., known and secure) firmware used to control access considerations, such as security, routing, and availability. The controlling bridge 238 may be configured to access registers of local and remote bridge elements 202, 204, 206, 208, as well as other hardware nodes 210, 212, 214. The automated register accesses may reduce potential bottlenecks and facilitate efficient processing.

Figure 3:
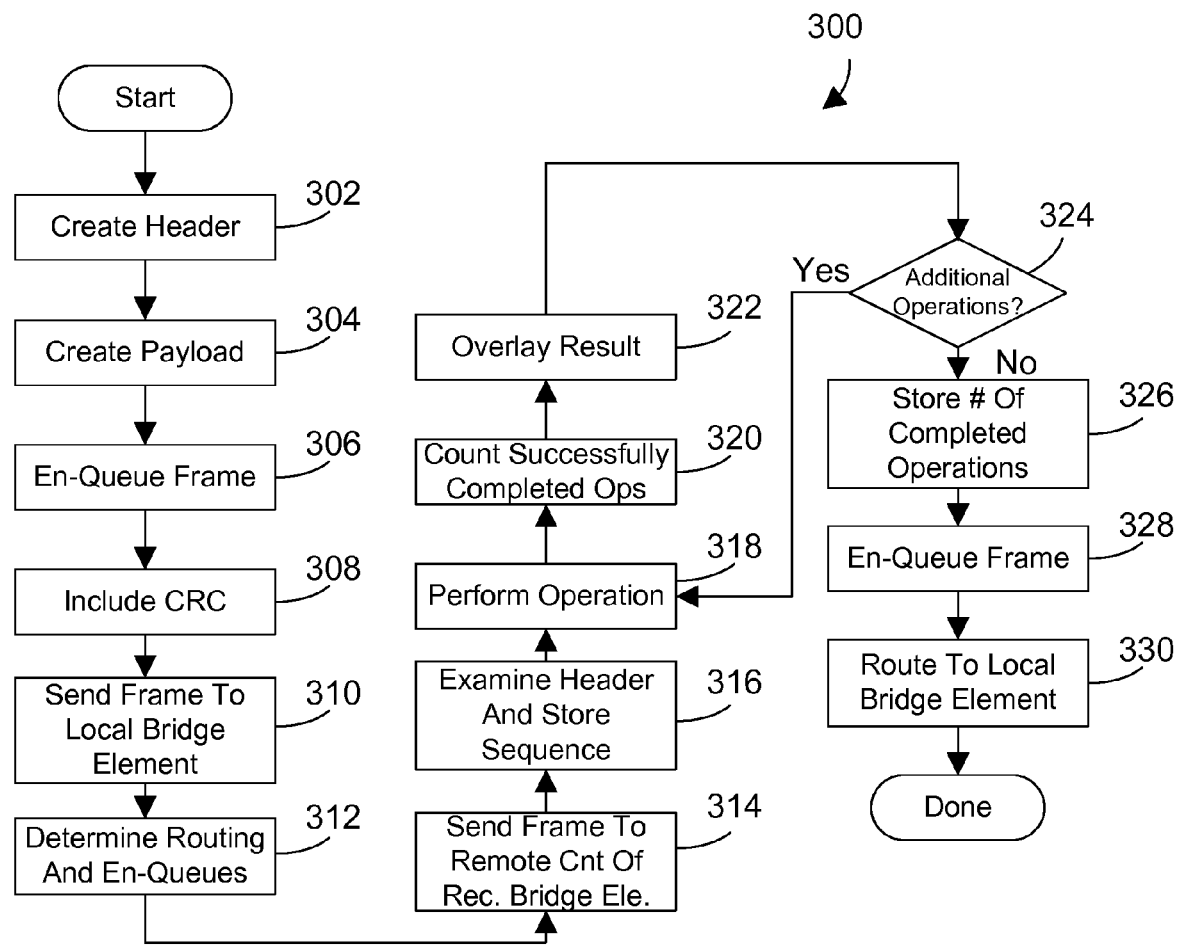
FIG. 3 is a flow diagram of a prior art method of using a controlling bridge to program registers of distributed bridge elements and other target nodes in the system of FIGS. 1 and 2.

FIG. 3 is a flow diagram of an embodiment of a method 300 of using a controlling bridge to program registers of distributed bridge elements and other target nodes. In a particular embodiment, the method 300 may be performed by a controlling bridge and bridge elements, such as the controlling bridge 238 and bridge elements 202, 204, 206, 208 of FIG. 2. At 302, a header of a data frame may be created. For example, the controlling bridge 238 of FIG. 2 may create a header that includes a destination address of a target bridge element 206 or other node. The header may also include a source address, such as a MAC address of the controlling bridge 238 or of a network interface card (NW) coupled to the controlling bridge 238. The header may further include a VLAN tag and an Ethertype (fields within the Ethernet Frame). A payload of the data frame may be created, at 304. For instance, the controlling bridge 238 of FIG. 2 may generate a payload that includes a register access request(s), sequence number, and a load/store protocol. At 306, the data frame may be en-queued. For example, the controlling bridge 238 of FIG. 2 may prepare the data frame for transmission at the NIC coupled to the controlling bridge 238. A cyclic redundancy check (CRC) or other checksum may be included within the data frame, at 308. For example, the NIC of the controlling bridge 238 of FIG. 2 may append a CRC to the data frame.

At 310, the data frame may be sent to a local bridge element. For instance, the controlling bridge 238 of FIG. 2 may send the data frame to the bridge element 202. The data frame routing information may be determined, at 312. For example, the bridge element 202 of FIG. 2 may determine a routing path of the data frame based upon the header. The bridge element 202 may further en-queue the data frame for delivery to a receiving bridge element 206 via the integrated switch router 212 and the transport layer module 214. The data frame may be sent to a remote control module of the receiving bridge element, at 314. For instance, when the bridge element 206 is the target of the data frame, the remote control module 221 of the bridge element 206 of FIG. 2 may receive the data frame. When the data frame is alternatively addressed to a non-bridge element (e.g., the partition 210 of FIG. 2), a bridge element 208 designated by the controlling bridge 238 to route data frames to non-bridge elements may receive the data frame.

At 316, the header may be examined, and the sequence number associated with the data frame may be stored. For instance, the remote control module 221 of FIG. 2 may evaluate the header of the received data frame. The remote control module 221 may further store the sequence number 217 associated with the data frame in the history queue 215. The register access request, or operation, may be performed, at 318. For instance, the bridge element 206 of FIG. 2 may perform a register access request on the registers 213. When the bridge element 208 has been designated as a bridge element control port and the partition 210 is a target node, the bridge element 208 may wait for a token to be available from the main register ring 246. The token may be used so that only the one bridge element having control of the token may access the target node at a time. When a token becomes available, the register access request may be placed on the main register ring 246 for delivery to the partition 210.

A count of successfully completed operations may be performed, at 320. For example, the bridge element 206 may determine a number of successfully completed register access requests to be stored as the operations count 219. A result of one or more of the operations may be overlaid in the data frame, at 322. For instance, the remote control module 221 may evaluate the outcome of each register access request, or operation. When an error is detected for a register access request, the remote control module 221 may insert an error status update into an operand field of the data frame associated with the register access request. The error status update may notify the controlling bridge 238 of the erroneous attempt so that a corrective action may be initiated. Operations may continue to be performed until no more operations associated with the frame are detected, at 324. If there are additional operations, then return to step 318. If there are no additional operations, then continue to step 326. In a particular embodiment, the remote control module 221 of FIG. 2 may detect a consecutive string of four zeros to programmatically signal an end of the register access requests of a data frame. The number of the successfully completed operations may be stored, at 326. For example, the remote control module 221 of FIG. 2 may store the number of successfully completed operations (e.g., load and store operations) associated with a given data frame in the operations count 219. The number of successfully completed operations may be used to determine whether an error was encountered while processing a register access request.

The data frame may be en-queued, at 328. For instance, the remote control module 221 of FIG. 2 may prepare the data frame for return to the controlling bridge 238 via the transport layer module 214. The remote control module 221 may additionally append an updated CRC. Accordingly, the data frame may be routed to the local bridge element, at 330. For instance, the transport layer module 214 may route the data frame via the integrated switch router 212 to the bridge element 202, and Ultimately, to the controlling bridge 238. The controlling bridge 238 may receive and store the returned data frame. FIG. 3 thus shows a method 300 of routing a data frame having a register access request through a network of distributed bridge elements. The controlling bridge 238 may initiate register access requests to facilitate greater accuracy and scalability. The main register ring 246 may be used, along with tokens and semaphores, to streamline remote and local register accesses.

Figure 4:
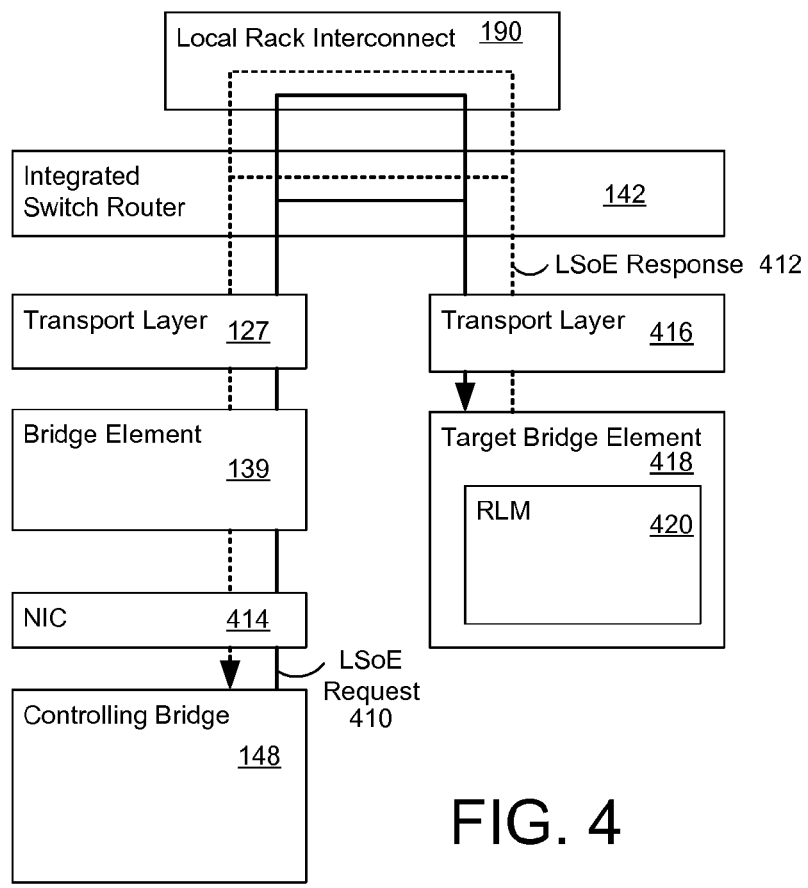
FIG. 4 is a block diagram to illustrate the message flow of a load store over Ethernet (LSoE) frame of data in the computer system.

FIG. 4 is a block diagram to illustrate the message flow of a load store over Ethernet (LSoE) frame of data in the computer system. The controlling bridge 148 initiates the LSoE 410 request by sending a LSoE data frame to the target bridge element 418 (see 513 in FIG. 5). The controlling bridge 148 is the same controlling bridge as shown in FIG. 1 and FIG. 2. The target bridge element 418 is similar to one of the Bridge elements shown in FIG. 1 and FIG. 2 but includes a random logic macro 420 with a frame processing engine (PFE) as described below. The controlling bridge communicates through the network interface card (NIC) 414 to the bridge element 139, through the transport layer 127 to the integrated switch router 142. If the target bridge element is on another board, then the frame will be sent through the local rack interconnect 190 and back to the integrated switch router before being sent to the transport layer 416 of the target bridge 418. If the target bridge is on the same board as the controlling bridge, then the frame will be routed through the integrated switch router 142 to the transport layer 416 and then on to the target bridge 418. Each bridge element has a random logic macro (RLM) which contains the LSoE frame processing engine (FPE) (see FIG. 5) to process LSoE frames. In FIG. 4, the controlling bridge 148 sends a request LSoE frame 410 to the RLM 420. The FPE within the RLM then processes the LSoE frame depending on the commands in the LSoE frame as described further below. The target bridge element 418 then sends a LSoE response 412 to the controlling bridge 148.

Figure 5:
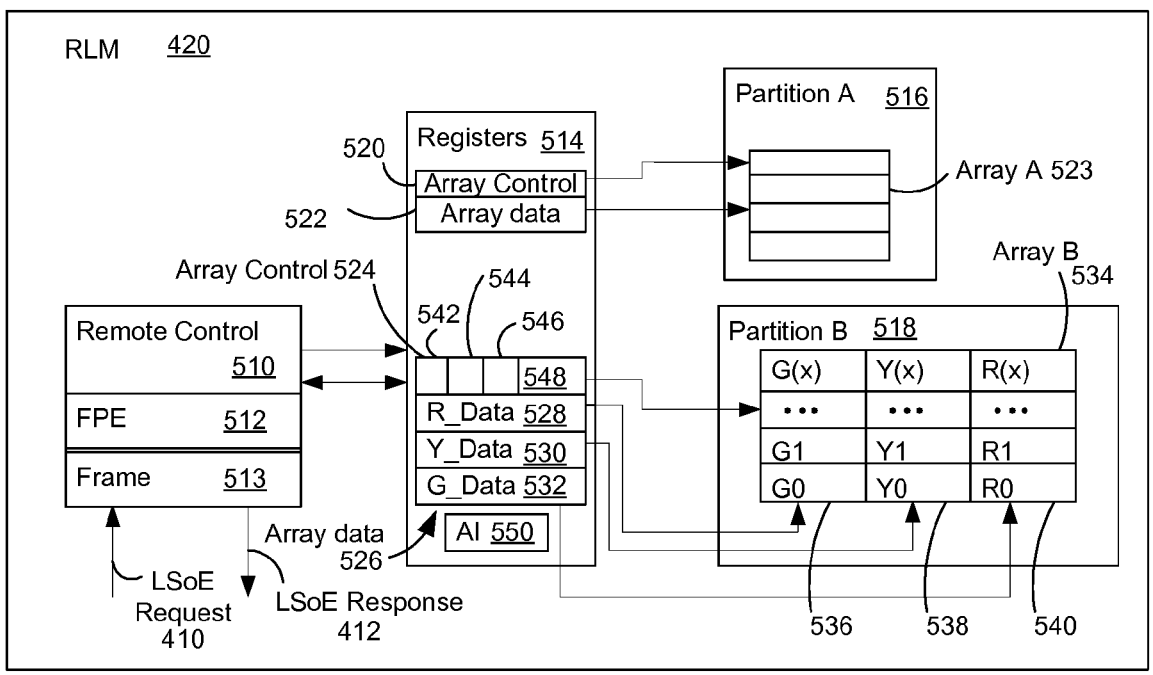
FIG. 5 is a block diagram of a random logic macro (RLM) that contains the LSoE frame processing engine (FPE) that processes the LSoE frame in the bridge elements.

FIG. 5 is a block diagram of a random logic macro (RLM) 420 in the target bridge element 418. The other bridge elements in FIG. 1 and FIG. 2 may also have similar RLMs 420. The RLM 420 includes a remote control 510 with a frame processing engine (FPE) 512 that processes the LSoE frame 513 included in the LSoE request 410 from the controlling bridge 148 in FIG. 4. The RLM also has various logic blocks and partitions. The logic blocks and partitions in the RLM are represented in the example of FIG. 5 by Registers partition 514, Partition A 516 and Partition B 518. Registers partition 514 has an Array Control Register 520 and Array Data Register 522 that are used to communicate data to and from Array A 523 in Partition A 516. Similarly, Array Control Register 524 and Array Data Registers 526 are used to communicate data to and from Array B 534 in Partition B 518. In this second example, the Array Data Registers 526 include three array data registers, G_Data 532, Y_Data 530 and R_Data 528. These Array Data Registers 526 are used to hold data read from or written to the corresponding columns of data in Array B 534. The corresponding columns are G 536, Y 538 and R 540. The columns have rows from 0 through (x) as shown. Thus the Array B 524 has column G 536 with data G0 through G(x), Column Y 538 with data Y0 through Y(x), and column R with data R0 through R(x). This array and the data are used in the example described below.

Referring again to FIG. 5 the operations to move a data payload more efficiently will be described. The array control register 524 includes an auto increment enable bit 542, an auto-increment trigger encode 544, an execute bit 546, and an array index 548. The auto increment enable bit is used to instruct the Registers partition 514 to automatically increment the array index 548 and re-enable the execute bit 546 of the Array Control Register 524 upon sensing a read or a write to one of the Array Data Registers 528, 530, or 532. The auto-increment trigger encode tells the registers partition which array data register read or write should trigger registers partition 514 to automatically increment the array index 548 and re-enable the execute bit 546 of the array control register 524 to initiate another read or write operation to Array B 534 as described further in the example below. The execute bit is used to tell the registers to execute the command in the Array Control Register 524. This bit is cleared by a done indication (not shown) back from the Array Partition 518. As described above, the controlling bridge 148 sends a LSoE frame 513 to the remote control 510 in the RLM 420 residing in the target bridge element (418 in FIG. 4). The FPE 512 then processes the frame 513 and returns the frame 513 as the LSoE response 412. To process the frame, the FPE sends a command to the registers partition 514. Registers partition 514 performs the requested operation to either extract or modify register contents. In some instances, modification of the register contents is sufficient to deem that the requested operation has completed. In other instances, modification of the register contents results in execution of a secondary operation such as a read or write to an array. In this case, the requested operation is not deemed complete until the secondary operation has completed. When the requested operation has completed, the registers partition 514 indicates completion status to the FPE 512. For read operations, the registers partition 514 also provides data read from the targeted register which is then overlaid onto the LSoE frame. FPE 512 then advances to perform the next command in the frame. This process continues until FPE detects a Null operation in the next command position. The LSoE response frame 412 is able to hold more data due to less command overhead than the prior art so that the system can move data more efficiently over the networks. The FPE 512 builds this more efficient LSoE response frame by processing the frame and obtaining data from the partition data arrays through the registers partition 514 as described herein.

FIG. 6 is a block diagram of a LSoE frame, along with the actions taken and results for sending data according to the prior art. In this prior art example, the data being accessed is 8 byte chunks of counter data shown as Cnt 0 through Cnt 90. A LSoE frame may contain 1522 bytes of which 1500 is payload. Of the 1500 bytes of payload, 2 bytes are used to identify the frame as an LSoE frame, 4 bytes are used for a sequence number, and 4 bytes are used to indicate a null op signifying the end of the command stream within the LSoE frame. Remaining in the payload there are 186 eight byte chunks of the frame available for control and data after the overhead (not shown) of the frame. This means the frame can process 93 operations where the operations are 8 bytes of control and 8 bytes of data. The first operation 610 with a control data pair sets up the transaction. The 8 byte control of the first operation 610 instructs the FPE 512 to set up the array control register to start an operation to read data from an array in an array partition using the auto increment function. The subsequent control data pairs (1-89) each read an eight byte chunk of data obtained by the registers from the data partition. The next to the last control data operation 612 is used to disable the auto increment function. This operation is not always required but may be essential for some data arrays to prevent a hardware error from the registers trying to read an invalid address. After disabling the auto increment, the last operation 614 reads the final data (Ctr 90). In this prior art frame example, one operation is used to set up the registers to read with auto increment, one operation is used to turn off the auto increment, and 91 operations (8 bytes control, 8 bytes data) are left to obtain and transfer data.

FIG. 7 is a block diagram of a LSoE frame, along with the actions taken and results for sending data using a repeat function as described and claimed herein. The first operation 710 has a control data pair that sets up the transaction in a similar manner as the prior art. The 8 byte control block of the first operation 710 instructs the FPE 512 to set up the array control register to start an operation to read data indirectly from an array in an array partition using the auto increment function. The subsequent control data pair 712 is a new repeat function that has a single 8 byte control block to read multiple 8 byte chunks of data. In this example, the 8 byte control block in operation 712 instructs the frame processing engine 512 to read 178 eight byte chunks of data as described further below. Similar to the prior art, a control data operation 714 can be used to disable the auto increment function when needed. After disabling the auto increment, the last operation 616 reads the final data (Ctr 179). In this example, one operation is used to set up the registers to read with auto increment, one operation is used to turn off the auto increment, and one repeat operation is used to obtain and transfer data. The one repeat operation has 8 bytes control and 178 eight byte blocks of data. Thus compared to the prior art, the LSoE frame with repeat is able to read and transfer 180 eight byte chunks compared to 91 in the prior art. This allows the LSoE frame using the repeat function to achieve a nearly two times the throughput of data to increase the efficiency of LSoE frames and thus leave more bandwidth in the system for other data transfers.

FIG. 8 is a block diagram of a LSoE frame, along with the actions taken and results for sending data using a repeat function with strobe as described and claimed herein. The first operation 810 has a control data pair that sets up the transaction similar to that above. The 8 byte control of the first operation 810 instructs the FPE 512 to set up the array control register 524 to start an operation to indirectly read data from an array in an array partition using the auto increment function. The subsequent control data pair 812 is a new repeat function with strobe that has a single 8 byte control to read multiple 8 byte chunks of data from more than one array data register. In this example, the 8 byte control in operation 812 instructs the frame processing engine to read and capture 177 eight byte chunks of data from the three array data registers (FIG. 5, 526). The FPE reads from the three array data registers and stores the data. Similar to the prior art, a control data operation 814 can be used to disable the auto increment function when needed. After disabling the auto increment, the last operation 816 reads the final 3 chunks of 8 byte data (Ctr G59, Y59, R59).

The processing of the LSoE frame shown in FIG. 8 will now be explained in more detail with reference to the hardware in FIG. 5. The FPE begins by processing the first operation 810 of the LSoE frame. As introduced above, this first operation instructs the FPE to set up the array control register 524 to start an operation to indirectly read data from an array in an array partition using the auto increment function. In this example, the 8 byte control in the first operation 810 indicates a write command with the target being the control register 524. The 8 byte data 810 is the command data to be sent to the control register 524. In response to the 8 byte control 810, the FPE sends the 8 byte data 810 to the array control 524 of the registers. The FPE then waits for the execute bit 546 to be cleared by a done indication from the array control that indicates a response is back from the array. The data sent to the array control 524 by the FPE includes the following. First, an array index 548 that points to the current row in the array to retrieve data. Second, an operation type (a read operation in this example). Third, an auto increment bit 542 that sets up the auto increment logic 550 to automatically increment the array index 548. Fourth, auto-increment trigger encode bits 544 that identify which of the Array Data 526 registers is designated as the trigger that will result in initiating a read operation to the next sequential index of the array, again capturing data into the array data registers (in this example it is set to trigger at R_data). Fifth, an execute bit 546 is also set in the control register to start execution of the command and communicate with the array partition. In response to the command set up by the FPE, the registers partition 514 sends a request to the array targeting the array index 548. The array responds with all data from that array index and the data is captured into G_Data 532, Y_Data 530, and R_Data 528 when the array gives done indication. When the registers sees the done indication it will clear the execute bit and indicate command completion to FPE. The array data registers 526 then hold G0, Y0, R0 from array B 534.

When the FPE receives command completion indication from registers partition 514, it then proceeds to process the next operation 812. The 8 byte control in operation 812 is a repeat with strobe command with a strobe count of 3 array data registers, a target G_data register and an empty payload of 177×8 bytes in the LSoE frame. At this point, the FPE will repeatedly read from the array data registers beginning with G_Data and the empty payload will be filled as the operation is completed. For the first read, the FPE reads the address G_Data 532. The contents of G_Data is returned from the registers and the G_Data is overlaid onto the first 8 bytes of the LSoE frame payload. Second, the FPE reads from the address Y_Data 530. Similarly, the contents of Y_Data is returned from the registers and overlaid onto the second 8 bytes of LSoE frame payload. The FPE then read from the R_Data register 528 and overlays the data into the third set of 8 bytes. The FPE then resets back to the G_data address for the next read. The FPE continues in this manner to cycle reading the three array data registers 526 and overlaying the data into the LSoE frame 512.

We will now consider what happens in the registers partition 514 while the FPE is processing the LSoE operations in the frame. As introduced above, the encode 544 indicates which array data register 526 should be used to trigger a strobe to reload data in the registers. When there is a read operation to the array data register 526 indicated by the encode bits 544, the auto increment logic 550 increments the index 548 to point to the next row of array data (in this case to G1, Y1, R1) and then re-enables the execute bit in the control register 524. This will send a read request to partition array B 534 to return all the data to array data registers 526. The execution bit is cleared and the data captured in the array data registers 526 upon the done indication. The array data registers 526 now contain the data from the array at G1, Y1, R1. This data will then be read by the next three subsequent reads from the FPE 512 to the array data registers.

Figure 9:
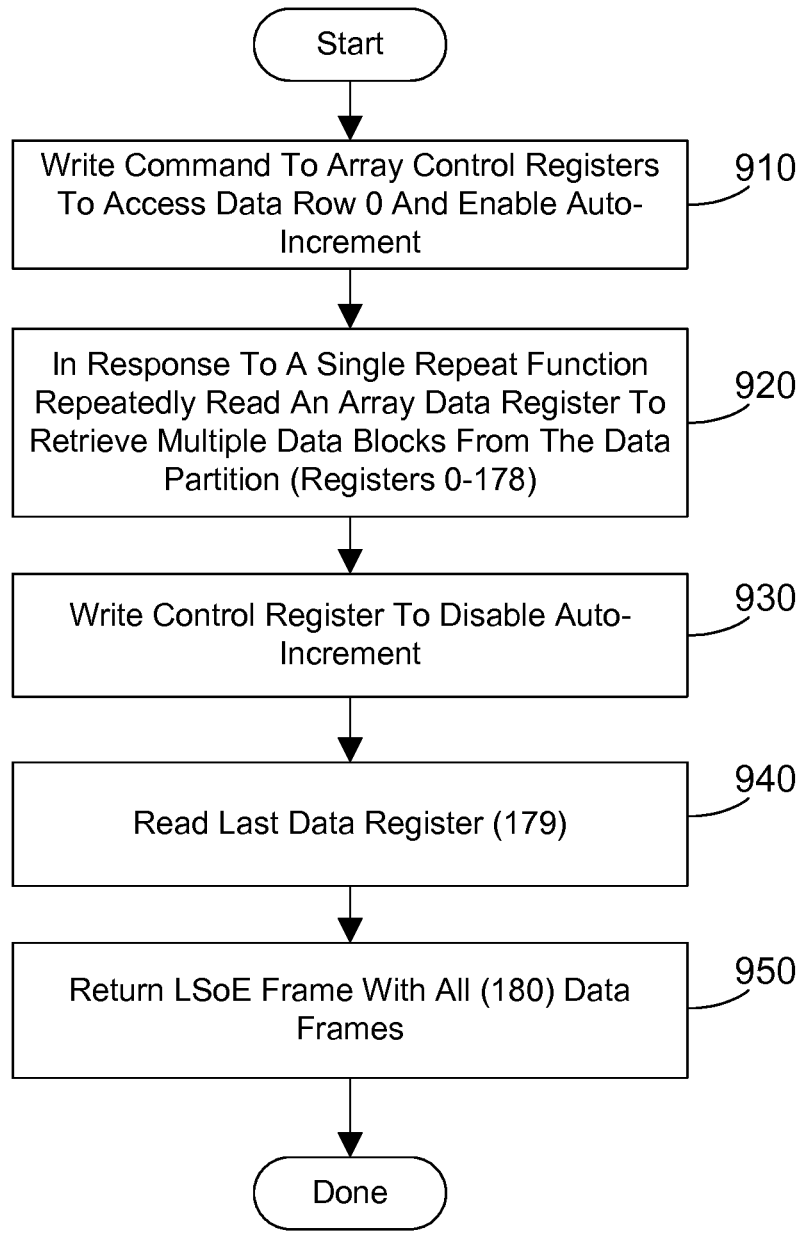
FIG. 9 is a method flow diagram for sending data with a LSoE frame using a repeat function as described and claimed herein.

FIG. 9 is a flow diagram of a method 900 for communicating data with a LSoE frame using a repeat function. The steps of the method are preferably carried out by the frame processing engine (FIG. 5, 512) in the remote control 510 communicating with registers partition 514 to build a LSoE Response 410. The method begins by writing a command to the array control register to set up communication to access a first data row in a partition array (step 910). In response to a single repeat function in the LSoE frame, repeatedly read an array data register in the registers partition to retrieve multiple data blocks from the data partition and store the data in the frame (step 920). Write to the control register to disable the auto increment (step 930). Read the last data register (step 940). Return the LSoE frame (step 950). The method is then done.

Figure 10:
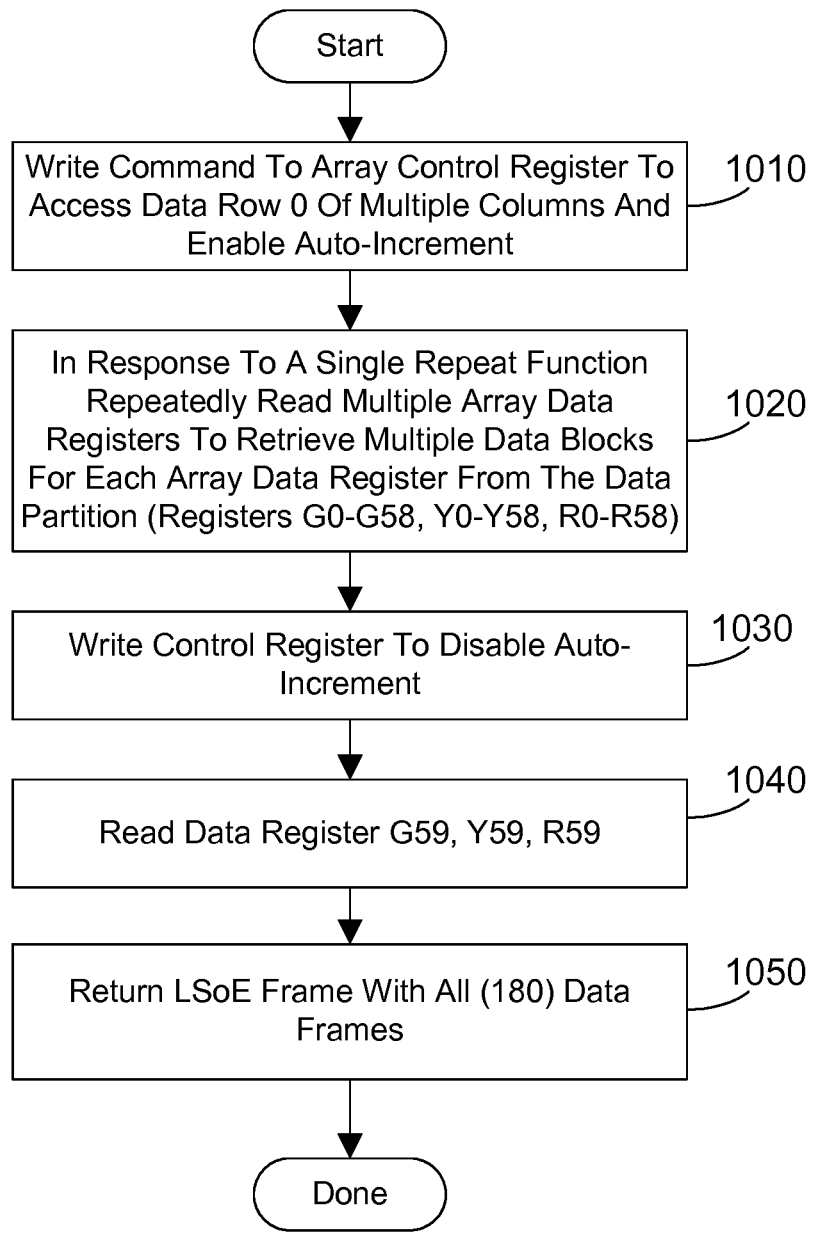
FIG. 10 is a method flow diagram for sending data with a LSoE frame using a repeat function with strobe as described and claimed herein.

FIG. 10 is a method flow diagram for sending data with a LSoE frame using a repeat function with strobe as described and claimed herein. The steps of the method are preferably carried out by the frame processing engine (FIG. 5, 512) in the remote control 510 communicating with registers partition 514 to build a LSoE Response 410. The method begins by writing a command to the array control register to set up communication to access multiple columns of a first data row in a partition array (step 1010). In response to a single repeat function with strobe in the LSoE frame, repeatedly read multiple array data registers in the registers partition to retrieve multiple data blocks for each array data register from the data partition and store the data in the frame (step 1020). Write to the control register to disable the auto increment (step 1030). Read the last data row for each array data register (step 940). Return the LSoE frame (step 1050). The method is then done.

The above examples focus on reads from the data arrays. Write operations are analogous but require a different sequence of events. For write operations, the order is somewhat different because the data registers in the array data 526 must be filled with register writes first, then write to the array control 524 to set up the control for the write operation. The repeat or repeat with strobe writes are then made to the data register(s). Similar to the above example, when the trigger register is written to as indicated by the trigger encode, the auto increment function 550 increments the index, and re-enables the execute bit to initiate the write of data from the array data registers to the arrays.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. Java is a registered trademark of Oracle America, Inc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment. In addition, the service could be divided among various different service providers. For example, multiple providers of mobile data networks could each provide different pieces of the mobile data network disclosed herein that cooperate together to provide the functions disclosed herein.

The disclosure and claims are directed to a system and method for providing a system and method for efficient transfer of data in an Ethernet frame from a controlling bridge to a register of a distributed bridge element. A Load Store over Ethernet (LSoE) frame processing engine (FPE) is equipped with a repeat and strobe function that, when coupled with an auto-increment function of an indirect register facility, allows a distributed virtual bridge to move data payload more efficiently which decreases the data loading on the computers data paths used for other data transfers.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
a plurality of server computers;
a plurality of distributed bridge elements in communication with the plurality of server computers, wherein each distributed bridge element is configured to access a register in response to receiving a data frame that includes a register access request, wherein the plurality of distributed bridge elements includes a target bridge; and
a controlling bridge configured to control the plurality of distributed bridge elements and to generate and communicate the data frame to a target bridge of the plurality of bridge elements; and
a frame processing engine in the target bridge that processes a repeat function coupled with an auto-increment function to move data payload more efficiently over an Ethernet network, wherein the repeat function uses a single control block to instruct the frame processing engine to read a plurality of data blocks indirectly through an array data register from an array in a data partition.

2. The apparatus of claim 1 further comprising a repeat function with strobe that uses the auto-increment function to move data payload more efficiently over the network, wherein the repeat function with strobe uses a single control block to read a plurality of data blocks indirectly through a plurality of data registers to read from the array in the data partition.

3. The apparatus of claim 2 wherein the repeat function with strobe uses a single control block to write a plurality of data blocks indirectly through the plurality of data registers to write to the array in the data partition.

4. The apparatus of claim 1 wherein the frame processing engine processes the repeat function by reading an 8 byte control block and writing an 8 byte data to an array control register in a register partition to enable the auto-increment function, then in response to the single control block, reads the plurality of data blocks indirectly through the array data register from the array in the data partition.

5. The apparatus of claim 1 wherein the frame is a load store over Ethernet (LSoE) frame and the network is an Ethernet network.

6. The apparatus of claim 1 wherein the repeat function uses a single control block to write a plurality of data blocks indirectly through the array data register to the array in the data partition.

7. The apparatus of claim 1 wherein the network is an Ethernet network.

8. An apparatus comprising:
a plurality of server computers;
a plurality of distributed bridge elements in communication with the plurality of server computers, wherein each distributed bridge element is configured to access a register in response to receiving a data frame that includes a register access request;
a controlling bridge configured to control the plurality of distributed bridge elements and to generate and communicate the data frame to a target bridge that is one of the plurality of distributed bridge elements;
a load store over Ethernet (LSoE) frame processing engine in the target bridge that processes a LSoE frame with a repeat function, wherein the repeat function incorporates an auto-increment function of an indirect register facility to move data payload more efficiently over an Ethernet network, wherein the repeat function uses a single 8 byte control block to instruct the frame processing engine to read a plurality of data blocks indirectly through an array data register from an array in a data partition; and
wherein the frame processing engine processes the repeat function by reading an 8 byte control block and writing an 8 byte data block to an array control register in a register partition to enable the auto-increment function, then in response to the single 8 byte control block, the frame processing engine reads the plurality of data blocks indirectly through the array data register from the array in the data partition.

9. The apparatus of claim 8 wherein the repeat function uses the single control block to write a plurality of data blocks indirectly through the array data register to the array in the data partition.

10. The apparatus of claim 8 further comprising a repeat function with strobe that uses the auto-increment function of the indirect register facility to move data payload more efficiently over an Ethernet network, wherein the repeat function with strobe uses the single control block to read the plurality of data blocks indirectly through a plurality of data registers to read from the array in the data partition.

11. The apparatus of claim 10 wherein the repeat function with strobe uses the single control block to write a plurality of data blocks indirectly through the plurality of data registers to write to the array in the data partition.

12. An apparatus comprising:

a plurality of server computers;

a plurality of distributed bridge elements in communication with the plurality of server computers, wherein each distributed bridge element is configured to access a register in response to receiving a data frame that includes a register access request;

a controlling bridge configured to control the plurality of distributed bridge elements and to generate and communicate the data frame to a target bridge that is one of the plurality of distributed bridge elements;

a load store over Ethernet (LSoE) frame processing engine in the target bridge that processes a LSoE frame with a repeat function, wherein the repeat function incorporates an auto-increment function of an indirect register facility to move data payload more efficiently over an Ethernet network;

wherein the frame processing engine processes the repeat function by reading a 8 byte control block and writing the first 8 byte control block to an array control register in a register partition to enable the auto-increment function, then in response to a single 8 byte control block, the frame processing engine reads 178 eight byte blocks of data indirectly through the array data register from the array in the data partition; and wherein the repeat function further uses a second single 8 byte control block to write a plurality of data blocks indirectly through the array data register to the array in the data partition.

\* \* \* \* \*